United States Patent
Bezer et al.

(10) Patent No.: US 11,905,610 B2
(45) Date of Patent: *Feb. 20, 2024

(54) METHOD OF IMPROVING THE CORROSION RESISTANCE OF A METAL SUBSTRATE

(71) Applicant: PPG INDUSTRIES OHIO, INC., Cleveland, OH (US)

(72) Inventors: Silvia Bezer, Gibsonia, PA (US); Steven R. Zawacky, Cranberry Township, PA (US); Egle Puodziukynaite, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 645 days.

This patent is subject to a terminal disclaimer.

(21) Appl. No.: 16/846,457

(22) Filed: Apr. 13, 2020

(65) Prior Publication Data

US 2020/0270758 A1    Aug. 27, 2020

Related U.S. Application Data

(63) Continuation of application No. 16/015,861, filed on Jun. 22, 2018, now Pat. No. 10,697,081.

(51) Int. Cl.

| | | |
|---|---|---|
| C25D 13/08 | (2006.01) | |
| C25D 13/10 | (2006.01) | |
| C25D 13/20 | (2006.01) | |
| B32B 15/08 | (2006.01) | |
| C25D 13/04 | (2006.01) | |
| C23F 11/173 | (2006.01) | |
| C09D 5/44 | (2006.01) | |
| C09D 7/40 | (2018.01) | |

(52) U.S. Cl.
CPC ........... C25D 13/04 (2013.01); C09D 5/4438 (2013.01); C09D 5/4453 (2013.01); C09D 5/4457 (2013.01); C09D 7/68 (2018.01); C09D 7/69 (2018.01); C09D 7/70 (2018.01); C23F 11/173 (2013.01); C09D 5/443 (2013.01); C09D 5/4411 (2013.01); C09D 5/4423 (2013.01); C09D 5/4465 (2013.01)

(58) Field of Classification Search
None
See application file for complete search history.

(56) References Cited

U.S. PATENT DOCUMENTS

| | | | |
|---|---|---|---|
| 3,362,899 A * | 1/1968 | Gilchrist | C09D 5/44 524/901 |
| 3,522,163 A | 7/1970 | Hartzell et al. | |
| 3,609,110 A | 9/1971 | Kumanotani | |
| 3,615,806 A | 10/1971 | Torock | |
| 4,540,725 A | 9/1985 | Jerabek et al. | |
| 5,035,785 A | 7/1991 | Debroy | |
| 5,203,975 A | 4/1993 | Richardson | |
| 5,767,191 A | 6/1998 | Zawacky et al. | |
| 6,017,432 A | 1/2000 | Boyd et al. | |
| 7,250,455 B2 | 7/2007 | Cody | |
| 7,749,368 B2 | 7/2010 | McMurdie et al. | |
| 8,840,761 B2 | 9/2014 | Woiceshyn | |
| 9,534,074 B2 | 1/2017 | Eswarakrishnan et al. | |
| 9,660,617 B2 | 5/2017 | Kong et al. | |
| 10,697,081 B2 * | 6/2020 | Bezer | C09D 5/4438 |
| 2001/0027230 A1 | 10/2001 | Urabe et al. | |
| 2002/0175082 A1 | 11/2002 | Sakamoto | |
| 2003/0054193 A1 | 3/2003 | McCollum et al. | |
| 2017/0226653 A1 | 8/2017 | Tersteeg | |

FOREIGN PATENT DOCUMENTS

| | | | | |
|---|---|---|---|---|
| EP | 2757123 A2 | 7/2014 | | |
| JP | 01-225678 A | 9/1989 | | |
| JP | 03-223496 A | 10/1991 | | |
| JP | 2002069358 A * | 3/2002 | | C09D 17/00 |
| JP | 2002121491 A | 4/2002 | | |

OTHER PUBLICATIONS

Bruggemann Michael; et al., "Electrocoat: Formulation and Technology", European Coatings Library, 2020, pp. 50-55, Vincentz Network, Hanover, Germany.

* cited by examiner

*Primary Examiner* — Michael J Feely

(74) *Attorney, Agent, or Firm* — Charles M. Yeomans

(57) ABSTRACT

The invention provides a method of improving the corrosion resistance of a metal substrate. The method comprises:

(a) electrophoretically depositing on the substrate a curable electrodepositable coating composition to form a coating over at least a portion of the substrate, and (b) heating the substrate to a temperature and for a time sufficient to cure the coating on the substrate. The electrodepositable coating composition comprises a resinous phase dispersed in an aqueous medium, the resinous phase comprising:

(1) an ungelled active hydrogen-containing, cationic salt group-containing resin electrodepositable on a cathode;

(2) an at least partially blocked polyisocyanate curing agent; and (3) a pigment component comprising an inorganic, plate-like pigment having an average equivalent spherical diameter of at least 0.2 microns. The electrodepositable coating composition demonstrates a pigment-to-binder ratio of at least 0.5. The coating composition contains less than 8 percent by weight of a grind vehicle.

18 Claims, No Drawings

METHOD OF IMPROVING THE CORROSION RESISTANCE OF A METAL SUBSTRATE

FIELD OF THE INVENTION

The present invention is directed to a method of improving the corrosion resistance of a metal substrate.

BACKGROUND OF THE INVENTION

Electrodeposition as a coating application method involves deposition of a film-forming composition onto a conductive substrate under the influence of an applied electrical potential. Electrodeposition has become standard in the coatings industry because, by comparison with non-electrophoretic coating means, electrodeposition offers increased paint utilization with less waste, improved corrosion protection to the substrate, and minimal environmental contamination.

Initially, electrodeposition was conducted with the workpiece to be coated serving as the anode. This was familiarly referred to as anionic electrodeposition. However, in 1972 cationic electrodeposition was introduced commercially and has become an industry standard. Today, cationic electrodeposition is by far the prevalent method of electrodeposition. In fact, a cationic primer coating is applied by electrodeposition to more than 80 percent of all motor vehicles produced throughout the world.

Electrodepositable coatings typically contain pigments that serve numerous purposes. Usually, the pigments are introduced into the coatings after incorporation into a grinding vehicle by a milling process. The use of a grinding vehicle reduces pigment agglomeration and allows for homogeneous dispersion of the pigment into the coating bulk, but it involves additional formulation steps at a higher cost. It also makes it difficult to incorporate a high level of pigment into the coating and weakens the corrosion barrier properties the coating by lowering the pigment-to-binder (P:B) ratio and crosslink density of the coating.

There remains a need in the coatings industry for a cost effective electrodepositable primer composition which allows for higher pigment loadings, to provide improved corrosion resistance to a metal substrate.

SUMMARY OF THE INVENTION

The present invention is directed to a method of improving the corrosion resistance of a metal substrate. The method comprises:
(a) electrophoretically depositing on the substrate a curable electrodepositable coating composition to form an electrodeposited coating over at least a portion of the substrate, and
(b) heating the substrate to a temperature and for a time sufficient to cure the electrodeposited coating on the substrate. The curable electrodepositable coating composition comprises a resinous phase dispersed in an aqueous medium, the resinous phase comprising:
(1) an ungelled active hydrogen-containing, cationic salt group-containing resin electrodepositable on a cathode;
(2) an at least partially blocked polyisocyanate curing agent; and
(3) a pigment component. The pigment component comprises an inorganic, platelike pigment having an average equivalent spherical diameter of at least 0.2 microns, and the inorganic platelike pigment is present in the resinous phase in an amount such that the electrodepositable coating composition demonstrates a pigment-to-binder ratio of at least 0.5. The electrodepositable coating composition contains less than 8 percent by weight of a grind vehicle, based on the total weight of solids in the electrodepositable coating composition. By improvement is meant that, after coating with the curable electrodepositable coating composition and after curing as described above, the metal substrate demonstrates improved salt spray corrosion resistance compared to a metal substrate of the same material that has been coated with a curable electrodepositable coating composition comprising a resinous phase dispersed in an aqueous medium, where the resinous phase contains: (1) an ungelled active hydrogen-containing, cationic salt group-containing resin electrodepositable on a cathode and (2) an at least partially blocked polyisocyanate curing agent as above, but does not contain the pigment component (3).

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of 1" to 10" is intended to include all sub-ranges between and including the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various examples of the present invention as presented herein are each understood to be non-limiting with respect to the scope of the invention.

In the method of the present invention, the curable electrodepositable coating composition can be electrophoretically deposited onto at least a portion of any of a variety of metal substrates. Suitable metal substrates can include ferrous metals and non-ferrous metals. Suitable ferrous metals include iron, steel, and alloys thereof. Non-limiting examples of useful steel materials include cold-rolled steel, galvanized (i.e., zinc coated) steel, electrogalvanized steel, stainless steel, pickled steel, zinc-aluminum alloys coated upon steel such as those available under the names GAL- VANNEAL®, GALVALUME®, AND GALVAN®, and combinations thereof. Useful non-ferrous metals include conductive carbon coated materials, aluminum, copper, zinc, magnesium and alloys thereof. Cold rolled steel also is suitable when pretreated with a solution such as a metal phosphate solution, an aqueous solution containing at least one Group IIIB or IVB metal, an organophosphate solution, an organophosphonate solution and combinations of the above as are discussed below. Combinations or composites of ferrous and non-ferrous metals can also be used.

The curable electrodepositable coating compositions can be applied to either bare metal or pretreated metal substrates. By "bare metal" is meant a virgin metal substrate that has not been treated with a pretreatment composition such as conventional phosphating solutions, heavy metal rinses and the like. Additionally, for purposes of the present invention, 'bare metal' substrates can include a cut edge of a substrate that is otherwise treated and/or coated over the non-edge surfaces of the substrate.

Before any treatment or application of any coating composition, the substrate optionally may be formed into an object of manufacture. A combination of more than one metal substrate of the same or different materials can be assembled together to form such an object of manufacture.

Also, it should be understood that as used herein, an electrodepositable composition or coating formed "over" at least a portion of a "substrate" refers to a composition formed directly on at least a portion of the substrate surface, as well as a composition or coating formed over any coating or pretreatment material which was previously applied to at least a portion of the substrate.

That is, the "substrate" upon which the coating composition is electrodeposited can comprise any electroconductive substrates including those described above to which one or more pretreatment and/or primer coatings have been previously applied. For example, the "substrate" can comprise a metallic substrate and a weldable primer coating over at least a portion of the substrate surface. The electrodepositable coating composition described above is then electrodeposited and cured over at least a portion thereof. One or more top coating compositions as described in detail below are subsequently applied over at least a portion of the cured electrodeposited coating.

For example, the substrate can comprise any of the foregoing electroconductive substrates and a pre-treatment composition applied over at least a portion of the substrate, the pretreatment composition comprising a solution that contains one or more Group IIIB or IVB element-containing compounds, or mixtures thereof, solubilized or dispersed in a carrier medium, typically an aqueous medium. The Group IIIB and IVB elements are defined by the CAS Periodic Table of the Elements as shown, for example, in the Handbook of Chemistry and Physics, (60th Ed. 1980). Transition metal compounds and rare earth metal compounds typically are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof.

The pretreatment composition carrier also can contain a film-forming resin, for example, the reaction products of one or more alkanolamines and an epoxy-functional material containing at least two epoxy groups, such as those disclosed in U.S. Pat. No. 5,653,823. Other suitable resins include water soluble and water dispersible polyacrylic acids such as those as disclosed in U.S. Pat. Nos. 3,912,548 and 5,328,525; phenol-formaldehyde resins as described in U.S. Pat. No. 5,662,746; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415.

Further, non-ferrous or ferrous substrates can be pretreated with a non-insulating layer of organophosphates or organophosphonates such as those described in U.S. Pat. Nos. 5,294,265 and 5,306,526. Such organophosphate or organophosphonate pretreatments are available commercially from PPG Industries, Inc. under the trade name NUPAL®. Application to the substrate of a non-conductive coating, such as NUPAL, typically is followed by the step of rinsing the substrate with deionized water prior to the coalescing of the coating. This ensures that the layer of the non-conductive coating is sufficiently thin to be non-insulating, i.e., sufficiently thin such that the non-conductive coating does not interfere with electroconductivity of the substrate, allowing subsequent electrodeposition of a electrodepositable coating composition. The pretreatment coating composition can further comprise surfactants that function as aids to improve wetting of the substrate. Generally, the surfactant materials are present in an amount of less than about 2 weight percent on a basis of total weight of the pretreatment coating composition. Other optional materials in the carrier medium include defoamers.

Due to environmental concerns, the pretreatment coating composition can be free of chromium-containing materials, i.e., the composition contains less than about 2 weight percent of chromium-containing materials (expressed as $CrO_3$), typically less than about 0.05 weight percent of chromium-containing materials, based on the total weight of the pretreatment composition.

In a typical pre-treatment process, before depositing the pre-treatment composition upon the surface of the metal substrate, it is usual practice to remove foreign matter from the metal surface by thoroughly cleaning and degreasing the surface. The surface of the metal substrate can be cleaned by physical or chemical means, such as by mechanically abrading the surface or cleaning/degreasing with commercially available alkaline or acidic cleaning agents which are well known to those skilled in the art, such as sodium metasilicate and sodium hydroxide. A non-limiting example of a suitable cleaning agent is CHEMKLEEN® 163, an alkaline-based cleaner commercially available from PPG Pretreatment and Specialty Products of Troy, Mich. Acidic cleaners also can be used. Following the cleaning step, the metal substrate is usually rinsed with water in order to remove any residue. The metal substrate can be air-dried using an air knife, by flashing off the water by brief exposure of the substrate to a high temperature or by passing the substrate between squeegee rolls. The pretreatment coating composition can be deposited upon at least a portion of the outer surface of the metal substrate. Usually, the entire outer surface of the metal substrate is treated with the pretreatment composition. The thickness of the pretreatment film can vary, but is generally less than about 1 micrometer, usually ranges from about 1 to about 500 nanometers, and more often ranges from about 10 to about 300 nanometers.

The pretreatment coating composition is applied to the surface of the metal substrate by any conventional application technique, such as by spraying, immersion or roll coating in a batch or continuous process. The temperature of the pretreatment coating composition at application is typically about 10° C. to about 85° C., and often about 15° C. to about 60° C. The pH of the pretreatment coating composition at application generally ranges from 2.0 to 5.5, and typically from 3.5 to 5.5. The pH of the medium may be adjusted using mineral acids such as hydrofluoric acid, fluoroboric acid, phosphoric acid, sulfamic acid, and the like, including mixtures thereof; organic acids such as lactic acid, acetic acid, citric acid, or mixtures thereof; and water soluble or water dispersible bases such as sodium hydroxide, ammonium hydroxide, ammonia, or amines such as triethylamine, methylethyl amine, or mixtures thereof.

Continuous processes typically are used in the coil coating industry and also for mill application. The pretreatment coating composition can be applied by any of these conventional processes. For example, in the coil industry, the substrate typically is cleaned and rinsed and then contacted with the pretreatment coating composition by roll coating with a chemical coater. The treated strip is then dried by heating, painted and baked by conventional coil coating processes.

Mill application of the pretreatment composition can be by immersion, spray or roll coating applied to the freshly mill-manufactured metal strip. Excess pretreatment composition is typically removed by wringer rolls. After the pretreatment composition has been applied to the metal surface, the metal can be rinsed with deionized water and dried at room temperature or at elevated temperatures to remove excess moisture from the treated substrate surface and cure any curable coating components to form the pretreatment coating. Alternatively, the treated substrate can be heated to a temperature ranging from 65° C. to 125° C. for 2 to 30 seconds to produce a coated substrate having a dried residue of the pretreatment coating composition thereon. If the substrate is already heated from the hot melt production process, no post application heating of the treated substrate is required to facilitate drying. The temperature and time for drying the coating will depend upon such variables as the percentage of solids in the coating, components of the coating composition and type of substrate.

The film coverage of the residue of the pretreatment composition generally ranges from 1 to 10,000 milligrams per square meter (mg/m2), and usually from 10 to 400 mg/m2.

A layer of a weldable primer also can be applied to the substrate, whether or not the substrate has been pretreated. A typical weldable primer is a zinc-rich mill applied organic film-forming composition, which is commercially available from PPG, Pittsburgh, Pa. as BONAZINC® This weldable primer can be applied to a thickness of at least 1 micrometer and typically to a thickness of 3 to 4 micrometers. Other weldable primers, such as iron phosphide-rich primers, are commercially available.

The electrodeposition process of the present invention typically involves immersing the electroconductive substrate into an electrodeposition bath of an aqueous electrodepositable composition; the substrate, which is usually metal, serving as a cathode in an electrical circuit comprising the cathode and an anode. Sufficient electrical current is applied between the electrodes to deposit a substantially continuous, adherent film of the electrodepositable coating composition onto at least a portion of the surface of the electroconductive substrate. Electrodeposition is usually carried out at a constant voltage in the range of from 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous, self-insulating film.

The electrodepositable coating composition used in the method of the present invention comprises a resinous phase dispersed in an aqueous medium. The resinous phase comprises (1) one or more ungelled, active hydrogen-containing, cationic salt group-containing resins (i.e., polymers), typically active hydrogen group-containing, cationic amine salt group-containing polymers, which are electrodepositable on a cathode; (2) one or more at least partially blocked polyisocyanate curing agents; and (3) a pigment component.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means that upon subjecting the composition to curing conditions, reaction of at least a portion of the reactive groups of the composition occurs, to form a polymerizate.

As used herein, "substantially uncured" means that the coating composition, after application to the surface of a substrate, forms a film which is substantially uncrosslinked; i.e., it is not heated to a temperature sufficient to induce significant crosslinking and there is substantially no chemical reaction between the polymeric component and the curing agent.

The term "reactive" refers to a functional group capable of undergoing a chemical reaction with itself and/or other functional groups spontaneously or upon the application of heat or in the presence of a catalyst or by any other means known to those skilled in the art.

Examples of ungelled active hydrogen-containing, cationic salt group-containing resins that are suitable for use in the electrodepositable coating compositions, typically as the main film-forming polymer, can include any of a number of cationic polymers well known in the art so long as the polymers are "water dispersible," i.e., adapted to be solubilized, dispersed or emulsified in water. Such polymers comprise cationic functional groups to impart a positive charge.

By "ungelled" is meant the resins are substantially free of crosslinking and demonstrate a measurable intrinsic viscosity when dissolved in a suitable solvent, as determined, for example, in accordance with ASTM-D1795 (published 2013) or ASTM-D4243 (published 2016). The intrinsic viscosity of the reaction product is an indication of its molecular weight. As used herein, a reaction product that is "substantially free of crosslinking" refers to a reaction product that has a weight average molecular weight (Mw), as determined by gel permeation chromatography, of less than 1,000,000 Da.

Also, as used herein, the term "polymer" is meant to refer to oligomers and both homopolymers and copolymers, and is used interchangeably with "resin". Unless stated otherwise, as used in the specification and the claims, molecular weights are number average molecular weights for polymeric materials indicated as "$M_n$," and obtained by gel permeation chromatography using polystyrene standards in an art-recognized manner.

Suitable examples of such cationic film-forming resins can include active hydrogen-containing, cationic polymers derived from one or more of a polyepoxide polymer, an acrylic polymer, a polyurethane polymer, a polyester polymer, mixtures thereof, and copolymers thereof; for example a polyester-polyurethane polymer. Typically, the resin (1) comprises an active hydrogen-containing, cationic polymer derived from a polyepoxide polymer and/or an acrylic polymer. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

As aforementioned, the polymers which are suitable for use as the cationic resin (1), comprise active hydrogens as curing reaction sites. The term "active hydrogen" refers to those groups which are reactive with isocyanates as determined by the Zerewitnoff test as is described in the JOURNAL OF THE AMERICAN CHEMICAL SOCIETY, Vol. 49, page 3181 (1927). In one example of the present invention, the active hydrogens are derived from hydroxyl groups, primary amine groups and/or secondary amine groups.

Suitable polyepoxides polymers for use as the active hydrogen-containing, cationic salt group-containing resin include, for example, a polyepoxide chain-extended by reacting together a polyepoxide and a polyhydroxyl group-containing material such as alcoholic hydroxyl group-containing materials and phenolic hydroxyl group-containing materials to chain extend or increase the molecular weight of the polyepoxide.

A chain-extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants, i.e., epoxy:polyhydroxyl group-containing material, is typically from about 1.00:0.75 to 1.00:2.00.

In general the epoxide equivalent weight of the polyepoxide will range from 100 to about 2000, typically from about 180 to 500, prior to chain extension. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl) propane, 1,1-bis(4-hydroxycyclohexyl)ethane, 2-methyl-1,1-bis(4-hydroxycyclohexyl) propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols.

Suitable acrylic polymers that may be used to prepare the active hydrogen-containing, cationic salt group-containing resin include copolymers of one or more alkyl esters of acrylic acid or methacrylic acid optionally together with one or more other polymerizable ethylenically unsaturated monomers. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include nitriles such acrylonitrile and methacrylonitrile, vinyl and vinylidene halides such as vinyl chloride and vinylidene fluoride and vinyl esters such as vinyl acetate. Acid and anhydride functional ethylenically unsaturated monomers such as acrylic acid, methacrylic acid or anhydride, itaconic acid, maleic acid or anhydride, or fumaric acid may be used. Amide functional monomers including, acrylamide, methacrylamide, and N-alkyl substituted (meth)acrylamides are also suitable. Vinyl aromatic compounds such as styrene and vinyl toluene are also suitable.

Functional groups such as hydroxyl and amino groups may be incorporated into the acrylic polymer by using functional monomers such as hydroxyalkyl acrylates and methacrylates or aminoalkyl acrylates and methacrylates. Tertiary amino groups (for conversion to cationic salt groups) may be incorporated into the acrylic polymer by using dialkylaminoalkyl (meth)acrylate functional monomers such as dimethylaminoethyl methacrylate, diethylaminoethyl methacrylate, dipropylaminoethyl methacrylate, and the like.

Epoxide functional groups (for conversion to cationic salt groups) may be incorporated into the acrylic polymer by using functional monomers such as glycidyl acrylate and methacrylate, 3,4-epoxycyclohexylmethyl(meth)acrylate, allyl glycidyl ether, or 2-(3,4-epoxycyclohexyl)ethyl(meth) acrylate. Alternatively, epoxide functional groups may be incorporated into the acrylic polymer by reacting hydroxyl groups on the acrylic polymer with an epihalohydrin or dihalohydrin such as epichlorohydrin or dichlorohydrin in the presence of alkali.

The acrylic polymer may be prepared by traditional free radical initiated polymerization techniques, such as solution or emulsion polymerization, as known in the art using suitable catalysts which include organic peroxides and azo type compounds and optionally chain transfer agents such as alpha-methyl styrene dimer and tertiary dodecyl mercaptan.

The active hydrogen-containing, cationic salt group-containing resin may alternatively or additionally be prepared from a polyester. The polyesters may be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol.

Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

The polyesters contain a portion of free hydroxyl groups (done by using excess polyhydric alcohol and/or higher polyols during preparation of the polyester) which are available for crosslinking reactions.

Epoxide functional groups may be incorporated into the polyester by reacting hydroxyl groups on the polyester with an epihalohydrin or dihalohydrin such as epichlorohydrin or dichlorohydrin in the presence of alkali.

Alkanolamines and dialkanolamines may be used in combination with the polyols in the preparation of the polyester, and the amine groups may later be alkylated to form tertiary amino groups for conversion to cationic salt groups. Likewise, tertiary amines such as N,N-dialkylalkanolamines and N-alkyldialkanolamines may be used in the preparation of the polyester. Examples of suitable tertiary amines include those N-alkyl dialkanolamines disclosed in U.S. Pat. No. 5,483,012, at column 3, lines 49-63. Suitable polyesters for use in the process of the present invention include those disclosed in U.S. Pat. No. 3,928,157.

Polyurethanes can also be used as the active hydrogen-containing, cationic salt group-containing resin. Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed above for use in the preparation of the polyester may also be used in place of or in combination with the polymeric polyols.

The organic polyisocyanate used to prepare the polyurethane is often an aliphatic polyisocyanate. Diisocyanates and/or higher polyisocyanates are suitable.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aralkyl diisocyanates are meta-xylylene diisocyanate and $\alpha,\alpha,\alpha',\alpha'$-tetramethylmeta-xylylene diisocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used in the preparation of the polyurethane.

Hydroxyl functional tertiary amines such as N,N-dialkylalkanolamines and N-alkyl dialkanolamines may be used in combination with the other polyols in the preparation of the polyurethane. Examples of suitable tertiary amines include those N-alkyl dialkanolamines disclosed in U.S. Pat. No. 5,483,012, at column 3, lines 49-63.

Epoxide functional groups may be incorporated into the polyurethane by reacting hydroxyl groups on the polyurethane with an epihalohydrin or dihalohydrin such as epichlorohydrin or dichlorohydrin in the presence of alkali.

The cationic resin used in the electrodepositable composition contains cationic salt groups. The cationic salt groups may be incorporated into the resin by any means known in the art depending on the type of resin and/or active hydrogen group, such as by acidifying tertiary amine groups in the resin as described below or by reacting epoxide groups in the resin with a cationic salt group former. By "cationic salt group former" is meant a material which is reactive with epoxy groups and which can be acidified before, during, or after reaction with epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides that can be mixed with acid prior to reaction with the epoxy groups and form ternary sulfonium salt groups upon subsequent reaction with the epoxy groups.

When amines are used as the cationic salt formers, monoamines are often used, and hydroxyl-containing amines are particularly suitable. Polyamines may be used but are not recommended because of a tendency to gel the resin.

In a typical example of the invention, the cationic salt group-containing resin contains amine salt groups, which are derived from an amine containing a nitrogen atom to which is bonded at least one, usually two, alkyl groups having a hetero atom in a beta-position relative to the nitrogen atom. A hetero atom is a non-carbon or non-hydrogen atom, typically oxygen, nitrogen, or sulfur.

Hydroxyl-containing amines, when used as the cationic salt group formers, may impart the resin with amine groups comprising a nitrogen atom to which is bonded at least one alkyl group having a hetero atom in a beta-position relative to the nitrogen atom. Examples of hydroxyl-containing amines are alkanolamines, dialkanolamines, alkyl alkanolamines, and aralkyl alkanolamines containing from 1 to 18 carbon atoms, usually 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Minor amounts of amines such as mono, di, and trialkylamines and mixed aryl-alkyl amines which do not contain hydroxyl groups, or amines substituted with groups other than hydroxyl which do not negatively affect the reaction between the amine and the epoxy may also be used, but their use is not preferred. Specific examples include ethylamine, methylethylamine, triethylamine, N-benzyldimethylamine, dicocoamine and N,N-dimethylcyclohexylamine.

The reaction of a primary and/or secondary amine with epoxide groups on the polymer takes place upon mixing of the amine and polymer. The amine may be added to the polymer or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50 to 150° C. may be done to hasten the reaction.

The tertiary amine functional polymer (or the reaction product of the primary and/or secondary amine and the epoxide functional polymer) is rendered cationic and water dispersible by at least partial neutralization with an acid.

Suitable acids include organic and inorganic acids such as formic acid, acetic acid, lactic acid, phosphoric acid, dimethylolpropionic acid, and sulfamic acid. Lactic acid is used most often. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with an epoxide functional polymer, the tertiary amine can be pre-reacted with the neutralizing acid to form the amine salt and then the amine salt reacted with the polymer to form a quaternary salt group-containing resin. The reaction is conducted by mixing the amine salt with the polymer in water. Typically the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally at or slightly above room temperature, to a maximum temperature of about 100° C. (at atmospheric pressure). At higher pressures, higher reaction temperatures may be used. Usually the reaction temperature is in the range of about 60 to 100° C. Solvents such as a sterically hindered ester, ether, or sterically hindered ketone may be used, but their use is not necessary.

In addition to or in lieu of the primary, secondary, and/or tertiary amines disclosed above, a portion of the amine that is reacted with the polymer can be a ketimine of a polyamine, such as is described in U.S. Pat. No. 4,104,147, column 6, line 23 to column 7, line 23. The ketimine groups decompose upon dispersing the amine-epoxy reaction product in water.

In addition to resins containing amine salts and quaternary ammonium salt groups, cationic resins containing ternary sulfonium groups may be used in forming the cationic salt group-containing resin. Examples of these resins and their method of preparation are described in U.S. Pat. No. 3,793,278 to DeBona and U.S. Pat. No. 3,959,106 to Bosso et al.

The extent of ionic salt group formation should be such that when the resin is mixed with an aqueous medium and the other ingredients, a stable dispersion of the electrodepositable composition will form. By "stable dispersion" is meant one that does not settle or is easily redispersible if some settling occurs. Moreover, the dispersion should be of sufficient ionic character that the dispersed particles will migrate toward and electrodeposit on a cathode or anode, as appropriate, when an electrical potential is set up between an anode and a cathode immersed in the aqueous dispersion.

Generally, the cationic resin is ungelled as defined above and contains from about 0.1 to 3.0, often from about 0.1 to 0.7 millequivalents of cationic salt group per gram of resin solids.

The active hydrogens associated with the cationic polymer include any active hydrogens which are reactive with isocyanates within the temperature range of about 93° C. to 204° C., usually about 121° C. to 177° C. Typically, the active hydrogens are selected from the group consisting of hydroxyl and primary and secondary amino, including mixed groups such as hydroxyl and primary amino. Often, the polymer will have an active hydrogen content of about 1.7 to 10 millequivalents, more often about 2.0 to 5 millequivalents of active hydrogen per gram of polymer solids.

The cationic salt group-containing resin (1) can be present in the electrodepositable composition used in the processes of the present invention in an amount ranging from 20 to 80 percent, often from 30 to 75 percent by weight, and typically from 50 to 70 percent by weight based on the total combined weight of the cationic salt group-containing resin and the curing agent.

The polyisocyanate curing agent (2) used in the curable electrodepositable coating composition is at least partially blocked. Often the polyisocyanate curing agent is a fully blocked polyisocyanate with substantially no free isocyanate groups. The polyisocyanate can be an aliphatic or an aromatic polyisocyanate or a mixture of the two. Diisocyanates are used most often, although higher polyisocyanates can be used in place of or in combination with diisocyanates.

Examples of polyisocyanates suitable for use as curing agents include all those disclosed above as suitable for use in the preparation of the polyurethane. In a particular example, the polyisocyanate is isophorone diisocyanate blocked with trimethylol propane and/or methyl ethyl ketoxime.

Any suitable aliphatic, cycloaliphatic, or aromatic alkyl monoalcohol or phenolic compound may be used as a capping (blocking) agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol monobutyl ether, diethylene glycol monobutyl ether, ethylene glycol monomethyl ether and propylene glycol monomethyl ether.

Other suitable capping agents include oximes such as methyl ethyl ketoxime, acetone oxime and cyclohexanone oxime, lactams such as epsilon-caprolactam, and amines such as dibutyl amine.

The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30. By "blocked" is meant that the isocyanate groups have been reacted with a compound such that the resultant blocked isocyanate group is stable to active hydrogens at ambient temperature but reactive with active hydrogens in the film forming polymer at elevated temperatures usually between 90° C. and 200° C. In one example of the present invention, the polyisocyanate curing agent is a fully blocked polyisocyanate with substantially no free isocyanate groups. By "ambient" temperature or conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.).

The at least partially blocked polyisocyanate curing agent (2) can be added to the electrodepositable composition as an individual component or it may be added to the reaction mixture of reactants during preparation of the ungelled active hydrogen-containing, cationic salt group-containing resin (1). The at least partially blocked polyisocyanate curing agent (2) may be present in the electrodepositable composition used in the processes of the present invention in an amount ranging from 80 to 20 percent, often from 70 to 25, and typically from 50 to 30 percent by weight, based on the total combined weight of the cationic salt group-containing resin and the curing agent.

The resinous phase of the electrodepositable coating composition further comprises (3) a pigment component. The pigment component comprises an inorganic, platelike pigment having an average equivalent spherical diameter of at least 0.2 microns and up to 5.0 microns. The average equivalent spherical diameter may be determined using dynamic light scattering, such as with a SEDIGRAPH III PLUS particle size analyzer, available from Micromeritics Instrument Corp. As platelike particles the pigment often has substantially opposing surfaces and particles typically exhibit an aspect ratio of 4:1 to 10:1. Usually the inorganic, platelike pigment comprises clay and/or talc. Examples of useful clays include kaolin clay having an average equivalent spherical diameter of at least 0.2 microns, such as at least 0.4 microns or at least 0.6 microns, up to 5.0 microns, or up to 3.5 microns, or up to 2.5 microns, or up to 1.5 microns. Suitable talc pigments often have an average equivalent spherical diameter of at least 0.6 microns, up 1.9 microns, or up to 1.5 microns, or up to 1.0 microns.

Typically, the inorganic platelike pigment is present in the resinous phase in an amount such that the P:B ratio in the electrodepositable coating composition is at least 0.5 and up to 3:1, depending on the composition and size of the pigment. In the phrase "pigment-to-binder (or P:B) ratio", the term "binder" refers to the total resin (1) and curing agent (2) in the coating composition. In other words, the inorganic platelike pigment is present in the resinous phase in an amount of at least 33 percent by weight, often at least 50 percent by weight, based on the total weight of the resinous phase up to 75 percent by weight. In particular examples, talc pigments having an average equivalent spherical diameter of 0.6 to 1.5 microns are usually used in an amount such that the P:B ratio is at least 0.5. Kaolin clays having an average equivalent spherical diameter of 0.2 to 3.5 microns are usually used in an amount such that the P:B ratio is at least 0.5, such as at least 1. The size (average equivalent spherical diameter), the platelike shape, and the amount of inorganic platelike pigments (P:B) used in the curable electrodepositable coating composition all contribute to improved corrosion barrier properties of the electrodeposited coating composition on the metal substrate.

The pigment component comprising the inorganic platelike pigment may be added to the resinous phase by dispersing it into either or both of the cationic salt group-containing resin (1) or the polyisocyanate curing agent (2) using conventional grinding techniques. Dispersing the pigment component in this way offers several advantages: (i) it eliminates the need for a conventional grinding vehicle, such that the curable electrodepositable coating composition may be essentially free of a grind vehicle, and (ii) it allows for a higher P:B ratio in the electrodepositable coating composition. The electrodepositable coating composition typically contains less than 8 percent by weight of a grind vehicle, often less than 5 percent by weight, and more often less than 3 percent by weight, based on the total weight of solids in the electrodepositable coating composition. Usually the electrodepositable coating composition is essentially free of a grind vehicle. By "essentially free" of a material is meant that a composition has only trace or incidental amounts of a given material if it is present at all, and that the material is not present in an amount sufficient to affect any properties of the composition. These materials are not essential to the composition and hence the composition is free of these materials in any appreciable or essential amount. If they are present, it is in incidental amounts only, typically less than 0.1 percent by weight, based on the total weight of solids in the composition. Additionally, corrosion barrier properties of the coating composition are improved because higher crosslink densities are attained in the final cured coating composition and costs are reduced. Usually the pigment component is dispersed in the cationic salt group-containing resin (1) prior to dispersion of the resinous phase into the aqueous medium.

The resinous phase is dispersed in an aqueous medium to prepare the curable, electrodepositable coating composition in the form of an electrodeposition bath. The curable, electrodepositable coating composition may additionally include optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used they are present in the electrodepositable composition in an amount of 0.1 to 2 percent by weight, based on the total weight of resin solids in the electrodepositable composition. Other optional additives such as additional colorants, surfactants, further wetting agents or catalysts can be included in the composition. Catalysts suitable for use in the curable electrodepositable composition include those known to be effective for reactions of isocyanates with active hydrogens.

Besides water, the aqueous medium of the electrodeposition bath may contain a coalescing solvent, surfactants, and other additives that may be dissolved in the water. Useful coalescing solvents include hydrocarbons, alcohols, esters, ethers and ketones. The most suitable coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, often from about 0.05 to about 5 percent by weight based on total weight of the aqueous medium.

The concentration of the resinous phase including the pigment in the aqueous medium is at least 1 and usually from 2 to 30 percent by weight, more often 10 to 30 percent by weight, based on total weight of the aqueous dispersion.

Generally, in the process of electrodeposition, the metal substrate being coated, serving as a cathode, and an electrically conductive anode are placed in contact with the cationic electrodepositable composition. Upon passage of an electric current between the cathode and the anode while they are in contact with the electrodepositable composition, an adherent film of the electrodepositable composition will deposit in a substantially continuous manner and consistent thickness on the electroconductive substrate.

In the method of the present invention, any of the aqueous, curable electrodepositable coating compositions described above are electrophoretically deposited on the substrate to form an electrodeposited coating over at least a portion of the substrate. The substrate serves as a cathode in an electrical circuit comprising the cathode and an anode, and the cathode and the anode are immersed in the aqueous electrodepositable coating composition. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film.

After electrodeposition, the coated substrate is heated to cure the deposited compositions. The heating or curing operation is usually carried out at a temperature less than 250° F. (121.1° C.), often less than 225° F. (107.2° C.), for a period of time sufficient to effect cure of the composition, typically ranging from 10 to 60 minutes. The thickness of the resultant film is usually from about 10 to 50 microns.

In most conventional cationic electrodeposition bath systems, the anode(s) are comprised of a ferrous material, for example, stainless steel. A typical cationic bath has an acidic pH ranging from 4.0 to 7.0, and often from 5.0 to 6.0. However, in a typical electrodeposition bath system, the anolyte (i.e., the bath solution in the immediate area of the anode) can have a pH as low as 3.0 or less due to the concentration of acid at or near the anode. At these strongly acidic pH ranges, the ferrous anode can degrade, thereby releasing soluble iron into the bath. By "soluble iron" is meant $Fe+2$ or $Fe+3$ ions derived from iron salts which are at least partially soluble in water. During the electrodeposition process, the soluble iron is electrodeposited along with the resinous binder and is present in the cured electrodeposited coating. It has been found that the presence of iron in soluble form can contribute to interlayer delamination of subsequently applied top coat layers from the cured electrodeposited coating layer upon weathering exposure. In view of the foregoing, it is desirable that the electrodepositable coating composition of the present invention, when in the form of an electrodeposition bath, comprises less than 10 parts per million, typically less than 1 part per million of soluble iron. This can be accomplished by the inclusion in the circuit of a non-ferrous anode.

In certain examples of the present invention, particularly when the substrate is an automotive body part, the coated substrate may further comprise a primer coating layer applied on the surface of the substrate subsequent to application and curing of the electrodepositable coating composition, followed by one or more topcoats. The primer coating layer and topcoat layers may comprise any coating composition known in the art; in an automotive application, the coatings are typically curable compositions. The coatings can comprise a resinous binder and a pigment and/or other colorant, as well as optional additives well known in the art of coating compositions. Nonlimiting examples of resinous binders are acrylic polymers, polyesters, alkyds, and polyurethanes.

Non-limiting examples of suitable base coat compositions include waterborne base coats such as are disclosed in U.S. Pat. Nos. 4,403,003; 4,147,679; and 5,071,904. Suitable clear coat compositions include those disclosed in U.S. Pat. Nos. 4,650,718; 5,814,410; 5,891,981; and WO 98/14379.

The top coat compositions can be applied by conventional means including brushing, dipping, flow coating, spraying and the like, but they are most often applied by spraying. The usual spray techniques and equipment for air spraying and electrostatic spraying and either manual or automatic methods can be used.

After application of each top coat to the substrate, a film is formed on the surface of the substrate by driving water out of the film by heating or by an air-drying period. Typically, the thickness of a pigmented base coat ranges from about 0.1 to about 5 mils (about 2.54 to about 127 microns), and often about 0.4 to about 1.5 mils (about 10.16 to about 38.1 microns). The thickness of a clear coat usually ranges from about 0.5 to about 5 mils (about 12.7 to about 127 microns), often about 1.0 to about 3 mils (about 25.4 to about 76.2 microns).

The heating will typically be only for a short period of time and will be sufficient to ensure that any subsequently applied top coating can be applied without any dissolution occurring at the coating interfaces. Suitable drying conditions will depend on the particular top coat composition and on the ambient humidity (if the top coat composition is waterborne), but in general a drying time of from about 1 to 5 minutes at a temperature of about 80° F. to 250° F. (20° C. to 121° C.) is used. Usually between coats, the previously applied coat is flashed, that is, exposed to ambient conditions for about 1 to 20 minutes.

After application of the top coat composition(s), the coated substrate is then heated to a temperature and for a period of time sufficient to effect cure of the coating layer(s). In the curing operation, solvents are driven off and the film-forming materials of the top coats are each crosslinked. The heating or curing operation is usually carried out at a temperature in the range of from 160° F. to 350° F. (71° C. to 177° C.) but if needed, lower or higher temperatures may be used as necessary to activate crosslinking mechanisms. Cure is as defined as above.

Metal substrates coated in accordance with the method of the present invention demonstrate excellent corrosion resistance as determined by salt spray and/or other cyclic corrosion resistance testing.

Each of the characteristics and examples described above, and combinations thereof, may be said to be encompassed by the present invention. The present invention is thus drawn to the following nonlimiting aspects:

1. A method of improving the corrosion resistance of a metal substrate comprising:
   (a) electrophoretically depositing on the substrate a curable electrodepositable coating composition to form an electrodeposited coating over at least a portion of the substrate, the electrodepositable coating composition comprising a resinous phase dispersed in an aqueous medium, said resinous phase comprising:
      (1) an ungelled active hydrogen-containing, cationic salt group-containing resin electrodepositable on a cathode;
      (2) an at least partially blocked polyisocyanate curing agent; and
      (3) a pigment component, wherein the pigment component comprises an inorganic, platelike pigment having an average equivalent spherical diameter of at least 0.2 microns; and wherein the inorganic platelike pigment is present in the resinous phase in an amount such that the electrodepositable coating composition demonstrates a pigment-to-binder ratio of at least 0.5; and wherein the electrodepositable coating composition contains less than 8 percent by weight of a grind vehicle, based on the total weight of solids in the electrodepositable coating composition; and
   (b) heating the substrate to a temperature and for a time sufficient to cure the electrodeposited coating on the substrate.

2. The method of aspect 1, wherein the cationic salt group-containing resin (1) is prepared from a polyepoxide polymer, an acrylic polymer, a polyurethane polymer, and/or a polyester polymer.

3. The method of aspect 1 or 2, wherein the cationic salt group-containing resin (1) contains cationic amine salt groups.

4. The method of any of aspects 1 to 4, wherein the inorganic, platelike pigment comprises clay and/or talc.

5. The method of any of aspects 1 to 4, wherein the inorganic, platelike pigment comprises kaolin clay having an average equivalent spherical diameter of 0.2 to 5.0 microns.
6. The method of any of aspects 1 to 5, wherein the electrodepositable coating composition demonstrates a pigment-to-binder ratio of at least 1.
7. The method of aspect 5, wherein the kaolin clay has an average equivalent spherical diameter of 0.2 to 3.5 microns.
8. The method of aspect 4, wherein the inorganic, platelike pigment comprises talc having an average equivalent spherical diameter of 0.6 to 1.9 microns.
9. The method of any of aspects 1 to 8 wherein the curable electrodepositable coating composition is essentially free of a grind vehicle.
10. The method of any of aspects 1 to 9 wherein the pigment component is dispersed in the cationic salt group-containing resin (1) prior to dispersion of the resinous phase into the aqueous medium.

Illustrating the invention are the following examples that are not to be considered as limiting the invention to their details. All parts and percentages in the examples, as well as throughout the specification, are by weight unless otherwise indicated. Example 1 is a control and represents the evaluation of a panel with a film containing no pigment. Example 2 is comparative and represents the evaluation of a panel with a film prepared from an electrodepositable coating composition having a pigment to binder ratio of 0.25. Example 3 represents the evaluation of a panel with a film prepared from an electrodepositable coating composition having a pigment to binder ratio of 0.5. Example 4 is comparative and represents the evaluation of a panel with a film prepared from an electrodepositable coating composition having a pigment to binder ratio of 0.5, with the pigment being added to the main film-forming resin as a paste using a grind vehicle present in an amount of about 8 percent by weight (U.S. Pat. No. 7,842,762 B2 (Example 24(a)), at column 37, lines 1-37). Example 5 represents the evaluation of a panel with a film prepared from an electrodepositable coating composition having a pigment to binder ratio of 0.75. Example 6 represents the evaluation of a panel with a film prepared from an electrodepositable coating composition having a pigment to binder ratio of 1. Example 7 represents the evaluation of a panel with a film prepared from an electrodepositable coating composition having a pigment to binder ratio of 1.1.

Resin Synthesis

Example R1: Preparation of a Blocked Polyisocyanate Crosslinker for Electrodepositable Coating Compositions (Crosslinker I)

A blocked polyisocyanate crosslinker (Crosslinker I), suitable for use in electrodepositable coating resins, was prepared in the following manner: components 2-5 listed in Table 1, below, were mixed in a flask set up for total reflux with stirring under nitrogen. The mixture was heated to a temperature of 35° C., and Component 1 was added dropwise so that the temperature increased due to the reaction exotherm and was maintained under 100° C. After the addition of Component 1 was complete, a temperature of 110° C. was established in the reaction mixture and the reaction mixture held at temperature until no residual isocyanate was detected by IR spectroscopy. Component 6 was then added and the reaction mixture was allowed to stir for 30 minutes and cooled to ambient temperature.

TABLE 1

| Component | Parts-by-weight (grams) |
|---|---|
| 1. Polymeric methylenediphenyl diisocyanate [1] | 1340.00 |
| 2. Dibutyltin dilaurate | 2.61 |
| 3. Methyl isobutylketone | 200.00 |
| 4. Diethylene glycolmonobutyl ether | 324.46 |
| 5. Ethylene glycolmonobutyl ether | 945.44 |
| 6. Methyl isobutylketone | 122.85 |

[1] Rubinate M, available from Huntsman Corporation.

Example R2: Preparation of a Cationic, Amine-Functionalized, Polyepoxide Based Resin (Resin RSP1)

A cationic, amine-functionalized, polyepoxide-based polymeric resin suitable for use in formulating electrodepositable coating compositions, was prepared in the following manner: components 1-5 listed in Table 2, below, were combined in a flask set up for total reflux with stirring under nitrogen. The mixture was heated to a temperature of 130° C. and allowed to exotherm (175° C. *maximum*). A temperature of 145° C. was established in the reaction mixture and the reaction mixture was then held for 2 hours. Components 6-8 were then introduced into the reaction mixture and a temperature of 110° C. was established in the reaction mixture. Components 9 and 10 were then added to the reaction mixture quickly and the reaction mixture was allowed to exotherm. A temperature of 121° C. was established in the reaction mixture and the reaction mixture held for 1 hour. After the hold, the heating source was removed from the reaction mixture and Component 11 was introduced slowly. The content of the flask was allowed to stir while cooling to room temperature. The resulting Resin Synthesis Product 1 (RSP1) had a solids content of 65% by weight.

TABLE 2

| No. | Component Resin Synthesis Stage | Parts-by-weight (grams) |
|---|---|---|
| 1 | Bisphenol A diglycidyl ether [1] | 1659.63 |
| 2 | Bisphenol A | 716.64 |
| 3 | Bisphenol A - ethylene oxide adduct (⅙ molar ratio BPA/EtO) | 337.50 |
| 4 | Methyl isobutyl ketone (MIBK) | 83.93 |
| 5 | Ethyl triphenyl phosphonium iodide | 1.62 |
| 6 | Bisphenol A - ethylene oxide adduct (⅙ molar ratio BPA/EtO) | 337.50 |
| 7 | Methyl isobutyl ketone | 140.53 |
| 8 | Crosslinker I [2] | 1943.12 |
| 9 | Diethylene triamine - MIBK diketimine [3] | 153.92 |
| 10 | Methyl ethanol amine | 131.43 |
| 11 | 1-Methoxy-2-propanol | 2117.62 |

[1] EPON 828, available from Hexion Corporation.
[2] See Example R1, above.
[3] 72.7% by weight (in MIBK) of the diketimine reaction product of 1 equivalent of diethylene triamine and 2 equivalents of MIBK.

Example Formulations

Formulation: A pigment (ASP-900, kaolin available from BASF having an average equivalent spherical diameter of 1.5 microns) was added to a resin (RSP1) and mixed under high sheer for 10 minutes, followed by addition of a catalyst paste (dibutyltin dioxide, DBTO), a dispersing agent (DYNASYLAN 4148, available from Evonik Industries) and diethylene glycol monobutyl ether-formaldehyde adduct. High sheer mixing continued for an additional 50 minutes. The resulting paste was dispersed in 100 g of aqueous sulfamic acid, mixed for 20 minutes, then diluted with the remaining water.

Electrocoating: 3"×2" ACT CRS C700 DIW panels were electrocoated at 90° F., 0.5 A and voltages (120-400V) were adjust to achieve 0.6-0.9 mils films.

Curing: The electrocoated panels were baked at 350° F. for 30 min.

Salt Spray: Panels were scribed with a 1.5" vertical line in the middle of the panel and placed in a salt spray cabinet for 1000 hours, according to ASTM B 117-73 (published 1979). The corrosion creep size was measured according to ASTM D 1654-08 (published 2016).

Whereas particular examples of this invention have been described above for purposes of illustration, it will be evident to those skilled in the art that numerous variations of the details of the present invention may be made without departing from the invention as defined in the appended claims. It is understood, therefore, that this invention is not limited to the particular examples disclosed, but it is intended to cover modifications which are within the spirit and scope of the invention, as defined by the appended claims.

Therefore, we claim:

1. An electrodepositable coating composition comprising a resinous phase dispersed in an aqueous medium, said resinous phase comprising:
   (1) an ungelled active hydrogen-containing, cationic salt group-containing resin;
   (2) an at least partially blocked polyisocyanate curing agent; and
   (3) a pigment component, wherein the pigment component comprises an inorganic, platelike pigment present in the resinous phase in an amount such that the electrodepositable coating composition demonstrates a pigment-to-binder ratio of at least 0.5,
   wherein the electrodepositable coating composition contains less than 8 percent by weight of a grind vehicle, based on the total weight of solids in the electrodepositable coating composition.

2. The electrodepositable coating composition of claim 1, wherein the inorganic, platelike pigment has an average equivalent spherical diameter of at least 0.2 microns.

| Formulation | Example 1 CONTROL | Example 2 COMPARATIVE | Example 3 | Example 4 COMPARATIVE | Example 5 | Example 6 | Example 7 |
|---|---|---|---|---|---|---|---|
| P/B | No Pigment | 0.25 | 0.5 | 0.5 | 0.75 | 1 | 1.1 |
| Raw Materials | Wt (g) | Wt (g) | Wt (g) | Wt (g) | Wt (g) | Wt (g) | Wt (g) |
| Resin (RSP1) | 277 | 246.2 | 205.1 | 163.8 | 176 | 153.8 | 146.2 |
| Pigment | 0 | 40 | 66.7 | 66.9 | 85.7 | 100 | 105 |
| Grinding Vehicle (described above) | — | — | — | 26.5 | — | — | — |
| Diethylene glycol monobutyl ether-formaldehyde | 3.6 | 3.2 | 2.7 | 2.7 | 2.3 | 2 | 1.9 |
| Catalyst DBTO* | 7.3 | 6.6 | 5.5 | 4.4 | 4.7 | 4.1 | 3.9 |
| Dispersing agent | 0 | 0.8 | 1.3 | 0 | 1.7 | 2 | 2.1 |
| Dispersion | | | | | | | |
| Sulfamic acid | 4.5 | 4 | 3.4 | 2.7 | 2.9 | 2.5 | |
| DI Water | 608 | 699 | 715.4 | 665 | 727 | 735.5 | |
| Total | 900 | 1000 | 1000 | 1000 | 1000 | 1000 | |
| Properties of Examples 1 to 7 | | | | | | | |
| Film Thickness (mils) | 0.76 | 0.9 | 0.85 | 0.76 | 0.84 | 0.8 | 0.6 |
| Salt Spray corrosion creep size (mm)** | 1.04 | 0.93 | 0.83 | 1.9 | 0.84 | 0.86 | 0.92 |

*DBTO added as a dispersion; prepared as described in U.S. Pat. No. 7,070,683 B2, at column 16, lines 10-30
**The panels were tested after 1000 hours of salt spray exposure, except for Example 1 (control), which was tested after 850 hours of salt spray exposure.

3. The electrodepositable coating composition of claim 1, wherein the cationic salt group-containing resin comprises a polyepoxide polymer, an acrylic polymer, a polyurethane polymer, and/or a polyester polymer.

4. The electrodepositable coating composition of claim 1, wherein the cationic salt group-containing resin contains cationic amine salt groups.

5. The electrodepositable coating composition of claim 1, Wherein the inorganic, platelike pigment comprises clay and/or talc.

6. The electrodepositable coating composition of claim 5, wherein the inorganic, platelike pigment comprises talc having an average equivalent spherical diameter of 0.6 to 1.9 microns.

7. The electrodepositable coating composition of claim 1, wherein the inorganic, platelike pigment comprises kaolin clay having an average equivalent spherical diameter of 0.2 to 5.0 microns.

8. The electrodepositable coating composition of claim 7, wherein the electrodepositable coating composition demonstrates a pigment-to-binder ratio of at least 1.

9. The electrodepositable coating composition of claim 1, wherein the kaolin clay has an average equivalent spherical diameter of 0.2 to 3.5 microns.

10. The electrodepositable coating composition of claim 1, wherein the electrodepositable coating composition is essentially free of a grind vehicle.

11. The electrodepositable coating composition of claim 1, wherein the pigment component is dispersed in the cationic salt group-containing resin prior to dispersion of the resinous phase into the aqueous medium.

12. A method of improving the corrosion resistance of a metal substrate comprising:

(a) electrophoretically depositing on the substrate the electrodepositable coating composition of claim 1 to form an electrodeposited coating over at least a portion of the substrate; and (b) heating the substrate to a temperature and for a time sufficient to cure the electrodeposited coating on the substrate.

13. The method of claim 12, wherein the cationic salt group-containing resin comprises a polyepoxide polymer, an acrylic polymer, a polyurethane polymer, and/or a polyester polymer.

14. The method of claim 12, wherein the inorganic, platelike pigment comprises clay and/or talc.

15. The method of claim 12, wherein the electrodepositable coating composition is essentially free of a grind vehicle.

16. The method of claim 12, wherein the pigment component is dispersed in the cationic salt group-containing resin prior to dispersion of the resinous phase into the aqueous medium.

17. The method of claim 12, further comprising applying a pretreatment composition over at least a portion of the metal substrate prior to electrophoretically depositing the electrodepositable coating composition on to the metal substrate.

18. A metal substrate coated by the method of claim 12.

* * * * *